March 29, 1955

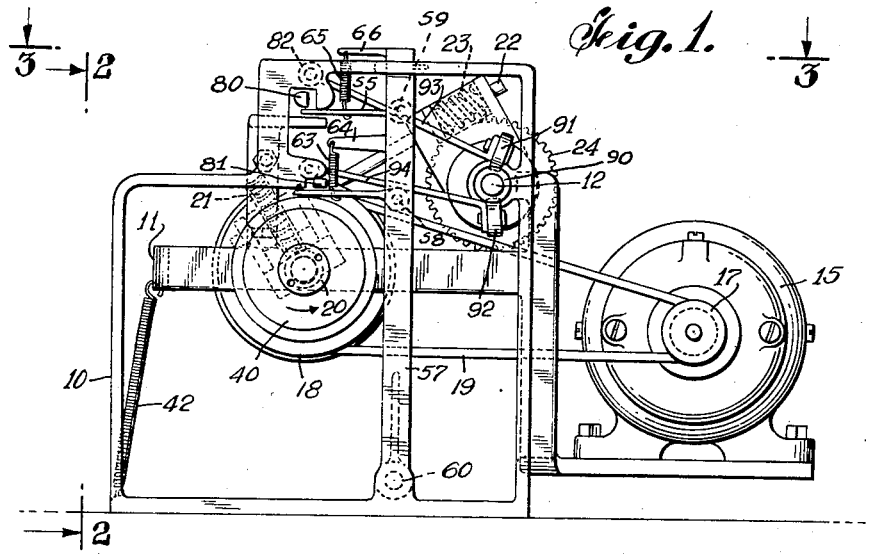

M. STOLOVE 2,704,964

KEY DUPLICATING MACHINE

Filed April 18, 1950

INVENTOR
MARTIN STOLOVE
BY
ATTORNEY

United States Patent Office 2,704,964
Patented Mar. 29, 1955

2,704,964

KEY DUPLICATING MACHINE

Martin Stolove, Camden, N. J.

Application April 18, 1950, Serial No. 156,522

3 Claims. (Cl. 90—13.05)

This invention relates to a key duplicating machine. The present machine is similar in character to the key duplicating machine which is shown and described in Patent No. 2,467,575 issued to me and to John Walker Hopkins, Sr., on April 19, 1949. The claims in that patent relate to certain aspects of the machine which are shown and described but not claimed in the present application. The claims of the present application relate to certain aspects of the machine which are shown and described but not claimed in said patent.

The principal object of this invention is the provision of a completely automatic key duplicating machine. All that need be done to duplicate keys on this machine is to insert the pattern key and key blank into a pair of fixed supports and then to close the electrical circuit of the machine. The machine does the rest: it clamps the keys in said supports in proper alignment with each other and with the pattern key follower and the key blank cutter. The follower engages the pattern key and the cutter engages the key blank and said blank is thereby cut in accordance with the pattern key. At the conclusion of the cutting operation, the pattern key follower disengages the pattern key, the cutter disengages the key blank and the clamps release said pattern key and key blank so that they may be withdrawn from the machine.

An extremely important feature of this invention is the fact that two key supports are fixedly mounted on the machine and the pattern key follower and blank key cutter are movably mounted in said machine. In the preferred form of this invention, the two key supports are disposed one above the other on a common vertical plane. The pattern key follower and blank key cuttter are supported on a carriage which is movably mounted on a horizontal shaft. The carriage is movable longitudinally of the shaft and also angularly about the shaft. Also in the preferred form of this invention, the two key supports are mounted on the carriage on one side of the shaft and the motor driving the cutter is mounted on the same carriage on the opposite side of the shaft. The motor also drives a cam which acts between the shaft and the carriage to move the carriage longitudinally of the shaft. The weight of the motor on one side of the shaft tends to swing the follower and cutter on the side of the shaft up into engagement with the pattern key and key blank respectively.

A preferred form of this invention is shown in the accompanying drawing in which:

Fig. 1 is a front view.

Fig. 2 is a side view looking in the direction of arrows 2, 2 of Fig. 1.

Figure 3:
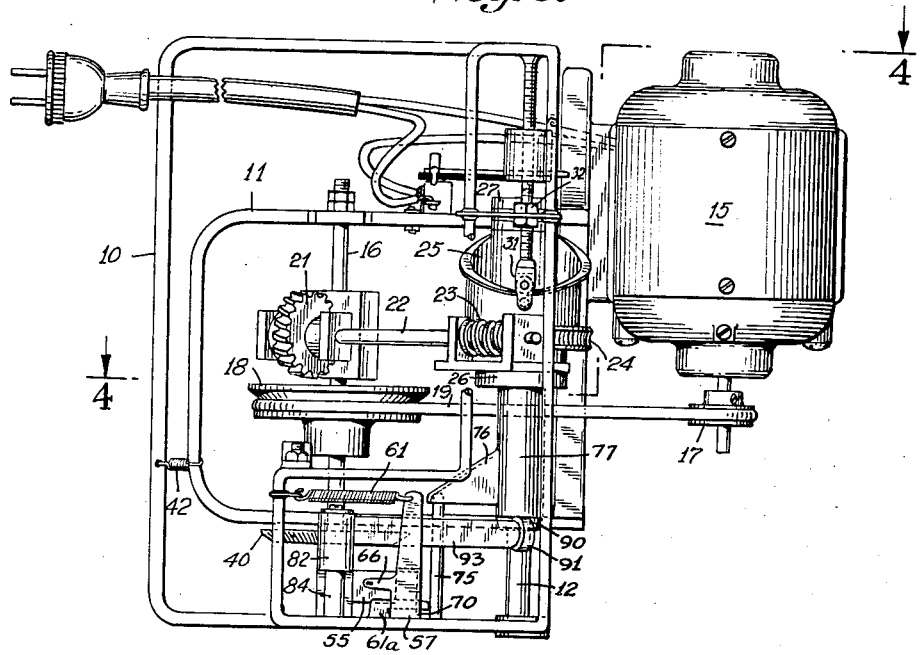
Fig. 3 is a top view looking in the direction of arrows 3, 3 of Fig. 1.
Figure 4:
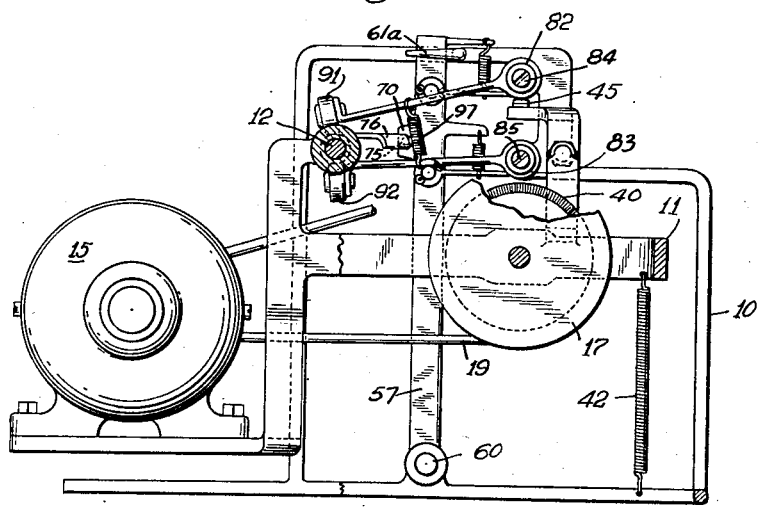
Fig. 4 is a sectional view looking in the direction of arrows 4, 4 of Fig. 3.

The machine herein claimed is mounted in a frame 10, which is normally encased within a housing or cabinet to protect the working mechanism. For purposes of clarity, however, the housing has not been shown in the drawing. Frame 10 is the stationary frame and it will be noted that a second frame 11 is pivotally mounted in frame 10 on rod 12. Movable frame 11 supports all of the working mechanism on the machine and it is not only pivotally movable on rod 12 but it is also linearly movable on said rod, axially thereof.

Mounted on movable frame 11, on one side of rod 12, is an electric motor 15. Mounted on movable frame 11, on the other side of rod 12, is a shaft 16. A pulley 17 on the shaft of the electric motor and a larger pulley 18 on shaft 16, and an endless belt 19 interconnecting said pulleys enable the electric motor to drive shaft 16. A worm 20 is affixed to the drive shaft 16 and it will be noted that this worm engages a gear wheel 21 mounted on a second shaft 22. A second worm 23 is affixed to the second shaft 22 and it will be noted that this second worm is in driving engagement with a gear wheel 24. Gear wheel 24 is mounted on a cam 25 which is itself mounted on rod 12. A pair of collars 26 and 27 respectively prevents axial movement of cam 25 relative to movable frame 11.

It will be understood from the foregoing that when the electric motor is set in operation by passing a current through it, it will cause the first worm 20 to rotate the shaft 22 and the second worm 23 on said shaft will thereby cause the gear wheel 24 to rotate. Since the gear wheel 24 is affixed to the cam 25, said cam will be caused to engage in corresponding rotary movement.

A bracket 30 is affixed to the stationary frame 10 and mounted on said bracket is a cam follower 31. It will be noted that there is an adjustable screw member 32 by which the cam follower is mounted on the bracket. It is by virtue of this adjustable screw member that the cam follower may be set in any predetermined or selected position relative to the cam 25 which it is shown to engage. Once the cam follower is set in a predetermined or selected position, it is fixed in that position. It has previously been indicated that the cam 25 is mounted on the rod 12 for both rotary and axial movement on said rod. It will be understood, therefore, that when the electric motor causes cam 25 to rotate in engagement with the cam follower 31, said cam will be caused to move axially on said rod with respect to said cam follower in the direction away from said cam follower. A tension spring 42 engages the movable frame 11 at one end and the stationary frame 10 at its opposite end. This spring accordingly resists movement of the movable frame 11 on rod 12, axially thereof, in the direction away from the cam follower 31. The cam 25 is free to rotate relatively to the movable frame 11, but the collars 26 and 27 prevent axial movement of said cam 25 relative to said movable frame 11. Hence, axial movement of the cam 25 and the frame 11 must necessarily be an integral movement of the one with the other. When, therefore, engagement of the cam 25 with the cam follower 31 causes an outward movement of said cam from said cam follower, a corresponding movement of the movable frame 11 will simultaneously be caused. And, by the same token, the spring action which resists the outward movement of the movable frame 11, will ipso facto resist the outward movement of the cam. When the rotary movement of the cam 25 tends to release it from engagement with the cam follower 31, the spring action acting upon the frame 11 and through said frame upon the cam 25 will automatically urge said cam into continued engagement with the cam follower. It will be understood, therefore, that by virtue of the action of the spring member 42, the cam 25 will at all times remain in engagement with the cam follower 31. The net effect of all this is to produce a reciprocatory movement of the movable frame 11 and of everything said frame supports, axially of rod 12.

Fixedly mounted on the drive shaft 16 is the cutting wheel 40. This is a conventional cutting wheel and its speed of rotation is determined by the speed of the electric motor and the ratio between pulleys 17 and 18. Since cutting wheel 40 is affixed to drive shaft 16 and since said drive shaft is mounted on movable frame 11, all of the movements of said movable frame will be transmitted to said cutting wheel. These movements of movable frame 11 may now be summarized as follows, since these movements are translated into corresponding movements of the cutting wheel 40: axial movement on rod 12, forward and back on said rod, and a pivotal movement on said rod controlled by the weight of the electric motor on one side of said rod and stabilized by spring 42 which interengages the movable and stationary frames 11 and 10 respectively on the other side of said rod 12. It will hereinafter be seen that another element which controls the pivotal movement of the movable frame 11 and the corresponding movement of the cutting wheel 40 is the pattern key follower 45.

Immediately above the cutting wheel 40, and forward of said cutting wheel, is a keyway 50 adapted to receive a key blank 51. Immediately above and slightly forward of key follower 45 is a second keyway 52 which accommodates a pattern key 53. Supporting the key blank 51 is a plate 54 and supporting the pattern key 53 is a similar plate 55. It will be noted that the key pattern and key blank are disposed in a vertical plane, the serrated edge of the pattern key and the corresponding edge of the key blank facing downwardly. The supporting plates 54 and 55 engage these edges of the two keys to support them in their respective keyways.

These two supporting plates 54 and 55 are pivotally mounted on post 57 by means of pins 58 and 59 respectively. These pins extend on parallel, horizontal lines. The post 57 is itself pivotally supported by means of pin 60 on stationary frame 10. A tension spring 61 connected on one end to the stationary frame 10 and at its opposite end to the free end of post 57, tends to urge said post to pivot in the direction of the two keyways. A stop member 61a secured to frame 10 limits the movement of post 57 under the influence of spring 61. A tension spring 63 connected to a bracket 64 on the pivotal post 57 and also connected to the plate 54 tends to urge said plate upwardly and in relatively tight contact with the key blank 51. A similar spring 65 affixed to bracket 66 on the pivotal post 57 and also affixed to the upper supporting plate 55 tends to hold said plate in relatively tight contact with the pattern key. When the two keys are slipped into their respective keyways, the two supporting plates are encountered and pushed out of the way against the action of springs 63 and 65. It is clear, therefore, that when the supporting plates are brought into this position they are well adapted by virtue of the action of springs 63 and 65 upon them to support the two keys in place.

The pivoted post 57 is the means by which key supporting plates 54 and 55 are brought into and out of supporting engagement with the key and key blank. It is clear that the key follower 45 would not be able to engage the key 53 and the cutting wheel 40 would not be able to engage the key blank 51 if the key supporting plates 54 and 55 remained in the positions below the keys. It is necessary, therefore, to move the supporting plates out of contact with the key and key blank before the cutting operation can take place. It will be seen that the pivotally mounted post 57 is provided with a bracket 70 to which is affixed a cam follower 75. The cam follower 75 engages a cam 76 which is attached to the sleeve 77 which rides freely on rod 12. Actually, the cam 25 is connected to sleeve 77 so that axial movement of said sleeve relative to said cam is precluded. It is evident, therefore, that when the cam moves back and forth upon the rod 12, the sleeve 77 will engage in corresponding movement. Such movement of the sleeve 77 results in engagement and disengagement of the cam 76 with the cam follower 75. It will be appreciated that when cam 76 moves into engagement with cam follower 75, the post 57 will be caused to pivot in order to move the key supporting plates 54 and 55 out of engagement with the key and the key blank. Said key and said key blank are now exposed for contact with the key follower and the cutting wheel.

It is essential that the key and key blank be held tightly in operative position after the key and key blank supporting members are removed therefrom. The means by which this is accomplished is the pair of clamps 80 and 81.

Clamps 80 and 81 are attached respectively to sleeves 82 and 83 mounted for rotation on pins 84 and 85. When these sleeves are caused to turn on their respective pin supports, they cause the clamps 80 and 81 to move into and out of engagement with the pattern key and the key blank. When they are in clamping engagement with the pattern key and key blank said key and key blank are held tightly in operative condition.

It will be seen that sleeve 77 terminates in the form of a cam 90. Two cam followers 91 and 92 are positioned to engage said cam 90 when the sleeve 77 moves in their direction on rod 12. These cam followers are mounted respectively on brackets 93 and 94 which are connected to sleeves 82 and 83. It will be understood from this construction that when the cam sleeve 77 moves into engagement with the cam followers 91 and 92, these cam followers and the brackets which support them are wedged apart. Since these brackets are connected to the sleeves 82 and 83 and since the clamp members 80 and 81 are connected to said sleeve members, this movement of cams 91 and 92 will be reflected by corresponding movement of the clamp pieces 80 and 81.

It will be apparent from the foregoing that a forward movement of the cam sleeve 77 against the cam followers effects a clamping action of clamps 80 and 81 against the pattern key and key blank. It will be noted that this movement of brackets 93 and 94 takes place against the action of a tension spring 97 which engages said brackets. In consequence, when the cam sleeve is retracted to a position out of contact with the cam followers 91 and 92, the spring 97 will draw said brackets 93 and 94 together and thereby move the clamp pieces 80 and 81 out of contact with the key and key blank.

It will be noticed that the action of the cam sleeve 77 upon the cam followers 91 and 92 is synchronized with the action of the cam 76 on cam follower 75. It is accordingly the case that the key and key blank supporting plates 55 and 54 respectively remain in supporting relation to the key and key blank until such time as the clamp members 80 and 81 take over, and themselves hold the key and key blank in place. By the same token, the clamp members remain in contact with the key and key blank until the supporting plates are moved into supporting position relative to said key and key blank. Since the cutting wheel 40 and the key follower 45 are mounted on the movable frame 11 and since said movable frame and the cam sleeve 77 move integrally with each other, it will be appreciated that the movement of said cutting wheel and said key follower with respect to the key blank and the pattern key is synchronized with the several movements above described with respect to the key clamps and the key supporting plates. More specifically, the key follower 45 and the cutting wheel 40 move into engagement with the key and key blank only after the key clamps have taken over the job of holding the key and key blank in place, from the plate supports.

It will be observed that the key follower 45 is adjustably mounted on the movable frame 11. A screw member 100 enables the key follower to be raised or lowered relative to the pattern key. The screw member 101 enables said key follower to be moved backward or forward in respect of said pattern key. It will be seen that the key follower 45 has been moved far in advance of the cutting wheel 40. It will normally be found desirable to bring the key follower into position immediately above the cutting wheel to correspond to the position of the pattern key immediately above the key blank.

A complete key duplicating operation may now be described: the key and key blank are inserted into their respective keyways 52 and 50 and they are held in position in said keyways by supporting plates 55 and 54. By conventional means which need not be shown in the drawing, an electric circuit is closed through the electric motor and said motor is thereby set in operation. The belt and pulley system and the gear train are now actuated to cause rotation of the main cam 25. Since this cam is in engagement with the fixed cam follower 31, a forward movement of said cam and hence of the cam sleeve 77 will result. The cam 76 will engage the cam follower 75 and the cam 90 will engage the cam followers 91 and 92. In consequence of such action, the clamp members 80 and 81 will move into clamping engagement with the key and key blank and the supporting plates 55 and 54 will move out of supporting contact with said key and key blank. The serrated edge of the key and the corresponding edge of the key blank are now exposed for the cutting operation. Since the travelling frame 11 and the cam sleeve 77 move integrally with each other in the same direction and since the key follower and the cutting wheel are mounted on said travelling frame, they too will move integrally with the cam sleeve, also in the same direction. Shortly after the clamp members take over the job of holding the key and key blank in place, the key follower encounters the key and simultaneously the cutting wheel enters into cutting engagement with the key blank.

The weight of the electric motor which is applied to the travelling frame 11 on the opposite side of rod 12 now tends to hold the key follower in continuous and uninterrupted engagement with the serrated edge of the key, and the cutting wheel in continued and unbroken contact with the key blank. The travelling frame 11 together with the key follower and the cutting wheel move forwardly until the key follower reaches the end of the serrated portion of the pattern key. By this time, the key blank has been cut in accordance with the pattern of the pattern key. The return movement of the travelling frame 11 now begins and the key blank cutting process is repeated. This second cutting process merely insures the accuracy of the original cutting operation. When the key follower and the cutting wheel clear the serrated edge of the key and the now serrated edge of the key blank, the backwardly travelling frame 11 moves the cams 76 and 90 out of engagement with the cam followers 75 and 91 and 92. The tension spring 61 now returns the pivotally mounted post 57 to the position which it is shown to occupy in the drawing. By virtue of this fact, the supporting plates 55 and 54 are brought back into the supporting positions under the key and key blank. At the same time, tension spring 97 draws the two brackets 93 and 94 together. The effect of such movement is to remove the clamping members 80 and 81 from clamping contact with the key and key blank. When the travelling frame reaches its farthermost position away from the key and key blank, the electric circuit to which the electric motor is connected, is broken by conventional means which need not be shown. The key and key blank may now be withdrawn from the machine and the cutting operation is completed. The foregoing represents a preferred embodiment of this invention and it must be clearly understood that the precise form which the invention has been permitted to take in this embodiment may be varied and changed in innumerable ways within the broad spirit and principles of this invention.

I claim:

1. In a key duplicating machine, a frame, means in said frame for supporting a pattern key and a key blank, a horizontal shaft fixed in said frame, a carriage mounted on said shaft for axial and angular movement thereon, reciprocating means between said carriage and said frame for causing reciprocating axial movement of said carriage on said shaft, a rotary key blank cutter rotatably mounted on said carriage for engagement with the key blank, a pattern key follower mounted on said carriage for engagement with the pattern key, and a motor mounted on said carriage and connected to the reciprocating means and the key blank cutter, said key blank cutter, pattern key follower, motor and reciprocating means being supported in fixed positions on said carriage to prevent relative movement toward or away from each other, whereby operation of the motor drives the reciprocating means and causes the carriage to move axially of the fixed shaft in reciprocating fashion, and simultaneously causes rotation of the key blank cutter.

2. In a key duplicating machine, a frame, means in said frame for supporting a pattern key and a key blank, a horizontal shaft fixed in said frame, a carriage mounted on said shaft for axial and angular movement thereon, reciprocating means between said carriage and said frame for reciprocating axial movement of said carriage on said shaft, a rotary key blank cutter rotatably mounted on said carriage for engagement with the key blank, a pattern key follower mounted on said carriage for engagement with the pattern key, and a motor mounted on said carriage and connected to the reciprocating means and the key blank cutter, whereby operation of the motor drives the reciprocating means and causes the carriage to move axially of the fixed shaft in reciprocating fashion and simultaneously causes rotation of the key blank cutter, said key blank cutter and the pattern key follower being mounted on said carriage on one side of the fixed shaft and said motor being mounted on said carriage on the opposite side of the fixed shaft, whereby the motor functions as a counter-weight to cause angular movement of the carriage for moving the key blank cutter into engagement with the key blank and the pattern key follower into engagement with the pattern key.

3. In a key duplicating machine, a frame, means in said frame for supporting a pattern key and a key blank, a horizontal shaft fixed in said frame, a carriage mounted on said shaft for axial and angular movement thereon, reciprocating means between said carriage and said frame for reciprocating axial movement of said carriage on said shaft, a rotary key blank cutter rotatably mounted on said carriage for engagement with the key blank, a pattern key follower mounted on said carriage for engagement with the pattern key, and a motor mounted on said carriage and connected to the reciprocating means and the key blank cutter, whereby operation of the motor drives the reciprocating means and causes the carriage to move axially of the fixed shaft in reciprocating fashion and simultaneously causes rotation of the key blank cutter, said reciprocating means comprising a cam which is mounted on the fixed frame and a cam follower which is mounted on the frame, said cam being free to move both axially and angularly of the shaft and being connected to the carriage to prevent movement of the cam relative to the carriage axially of the fixed shaft, said cam and carriage being, however, free to move relative to each other angularly of the fixed shaft.

References Cited in the file of this patent

UNITED STATES PATENTS

| | | |
|---|---|---|
| 2,148,668 | Yoskowitz et al. | Feb. 28, 1939 |
| 2,467,575 | Stolove et al. | Apr. 19, 1949 |